United States Patent [19]

Udagawa et al.

[11] Patent Number: 4,754,982

[45] Date of Patent: Jul. 5, 1988

[54] STEEL LAMINATE GASKET

[75] Inventors: Tsunekazu Udagawa, Ichikawa; Susumu Inamura, Tokyo, both of Japan

[73] Assignee: Ishikawa Gasket Co., Ltd., Tokyo, Japan

[21] Appl. No.: 936,872

[22] Filed: Dec. 2, 1986

[30] Foreign Application Priority Data

Sep. 16, 1986 [JP] Japan .......................... 61-141522[U]

[51] Int. Cl.$^4$ .............................................. F16J 15/12
[52] U.S. Cl. ................................ 277/235 B; 277/234; 277/236
[58] Field of Search ............... 277/227, 228, 233, 234, 277/235 R, 235 B, 236

[56] References Cited

U.S. PATENT DOCUMENTS

| 2,034,610 | 3/1936 | Dickson | 277/235 B |
| 4,285,527 | 8/1981 | Connely | 277/235 B |
| 4,351,534 | 9/1982 | McDowell | 277/235 B |
| 4,402,578 | 9/1983 | Locacius | 277/235 B X |

FOREIGN PATENT DOCUMENTS

| 2,803,932 | 8/1979 | Fed. Rep. of Germany ... 277/235 B |
| 3001599 | 7/1981 | Fed. Rep. of Germany ... 277/235 B |
| 3224676 | 1/1984 | Fed. Rep. of Germany ... 277/235 B |
| 2306078 | 10/1976 | France ............................. 277/235 B |
| 55-112844 | 9/1980 | Japan ................................ 277/235 B |

Primary Examiner—Robert S. Ward
Attorney, Agent, or Firm—Frank J. Jordan; C. Bruce Hamburg; Manabu Kanesaka

[57] ABSTRACT

A steel laminate gasket designed to efficiently seal engine parts having high and non-high pressure areas. The gasket comprises a core plate extending throughout entire area of the engine to be sealed, at least one metal plate situated above the core plate, and at least one soft sheet situated above the core plate. The metal plate is placed adjacent to the high pressure areas of the engine so that the high pressure areas of the engine are sealed by the core plate and the metal plate. The soft sheet is made of a soft gasket material and is placed adjacent to the non-high pressure area so that the non-high pressure areas of the engine are sealed by the core plate and the soft sheet.

9 Claims, 4 Drawing Sheets

FIG. 4
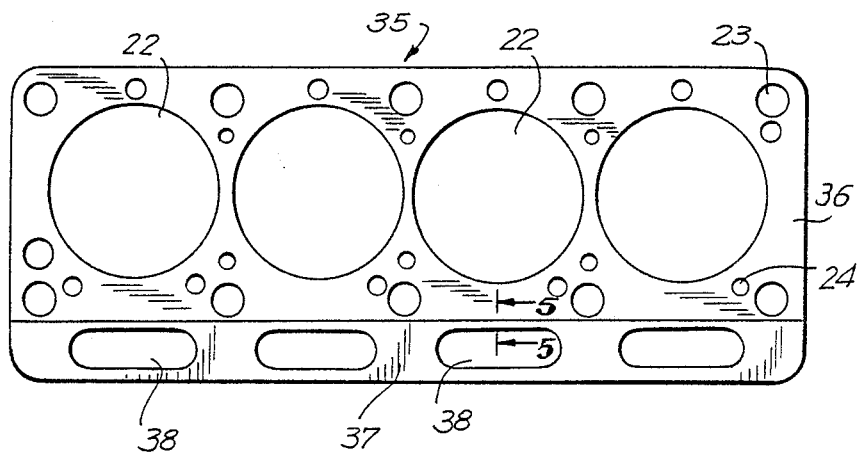
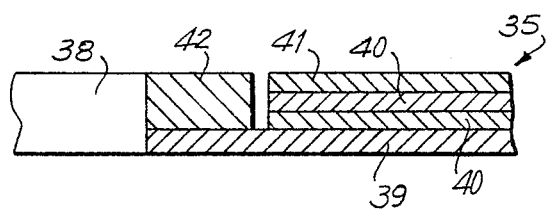
FIG. 5

FIG. 8
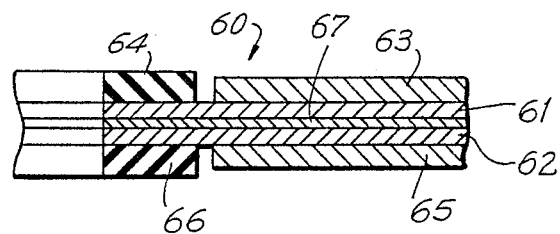
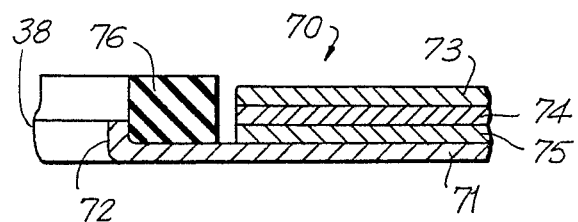
FIG. 9

STEEL LAMINATE GASKET

BACKGROUND OF THE INVENTION AND RELATED ART STATEMENT

The present invention relates to a steel laminate gasket, more particularly, a steel laminate gasket properly sealing engine parts having high and non-high pressure areas therein even if the gasket receives a low tightening pressure at the non-high pressure areas.

An internal combustion engine is provided with a large hole for a chain case and small holes for cooling water, push rods and so on as well as cylinder bores for pistons. The engine is formed of a plurality of engine parts connected together by bolts, wherein a gasket is positioned between the two engine parts for sealing therebetween.

Generally, the cylinder bores receive high pressure, but the holes other than the cylinder bores do not receive so high pressure. Therefore, the engine parts are tightened strongly around the cylinder bores, while the other portions of the engine parts are not tightened so strongly. In this respect, the gasket is designed to actuate or work properly by receiving high pressure at portions adjacent the cylinder bores and by receiving non-high pressure at portions away from the cylinder bores.

A conventional steel laminate gasket is provided with sealing materials made of rubber around holes other than the cylinder bores of an engine, an example of which is shown in FIG. 1. Namely, a conventional steel laminate gasket 10 comprises a body portion 11 including an upper plate 12, a lower plate 13, two inner plates 14 and a core material 15, and a rubber ring 16. The core material 15 does not extend to an edge of a hole 17 for liquid, such as a water hole or oil hole, thereby to form a lateral concave 18 around the hole 17. A part of a plate 19 attached to the rubber ring 16 is placed in the concave 18, so that the ring 16 is connected to the body portion of the steel laminate gasket 10.

When the gasket 10 is used, the gasket 10 is placed between two engine parts (not shown) and the engine parts are tightened by bolts (not shown). Consequently, the ring 16 is sandwiched and pushed by the engine parts to thereby seal around the hole 17.

In this conventional steel laminate gasket 10, since the ring 16 is made of rubber, an outer surface of the ring 16 may be cracked or a quality of rubber goes wrong due to a long period of use. Consequently, sealing ability of the ring 16 decreases. In an extreme situation, the ring 16 can not seal properly around a hole of an engine.

Accordingly, one object of the present invention is to provide a steel laminate gasket, which can seal properly in non-high pressure receiving areas as well as high pressure receiving areas.

Another object of the invention is to provide a steel laminate gasket as explained above, which can be efficiently used for a long period of time.

A further object of the invention is to provide a steel laminate gasket as explained above, which can be manufactured economically.

Further objects and advantages of the invention will be apparent from the following description of the invention.

SUMMARY OF THE INVENTION

In accordance with the present invention, a steel laminate gasket is designed to efficiently seal engine parts having high and non-high pressure areas. The gasket comprises a core plate extending throughout an entire area of the engine to be sealed, at least one metal plate situated above the core plate, and at least one soft sheet situated above the core plate. The metal plate is placed adjacent to the high pressure areas of the engine so that the high pressure areas of the engine are sealed by the core plate and the metal plate. The soft sheet is made of a soft gasket material and placed adjacent to the non-high pressure areas of the engine so that the non-high pressure areas of the engine are sealed by the core plate and the soft sheet.

The soft sheet is a beater sheet, a compressed sheet, a soft graphite sheet, or the like. The soft sheet is adhered to the core plate by glue.

The core plate may be provided with a plurality of small holes adjacent the non-high pressure areas of the engine so that when the soft sheet is placed above and pushed against the core plate, the soft sheet is engaged with the small holes of the core plate to thereby hold the soft sheet securely on the core plate.

BRIEF DESCRIPTION OF THE DRAWINGS

FIG. 4 is a plan view of a second embodiment of a steel laminate gasket of the invention;

FIG. 5 is an enlarged section view taken along a line 5—5 in FIG. 4;

FIG. 8 is a section view similar to FIG. 5 for showing a fourth embodiment of a steel laminate gasket of the invention; and FIG. 9 is a section view similar to FIG. 8 for showing a fifth embodiment of a steel laminate gasket of the invention.

DETAILED DESCRIPTION OF PREFERRED EMBODIMENTS

Figure 2:
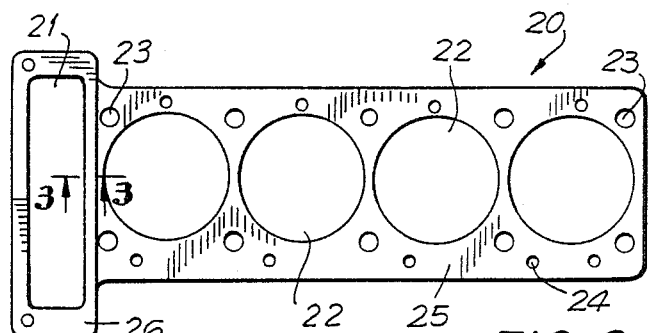
FIG. 2 is a plan view of a first embodiment of a steel laminate gasket in accordance with the present invention.
Figure 3:
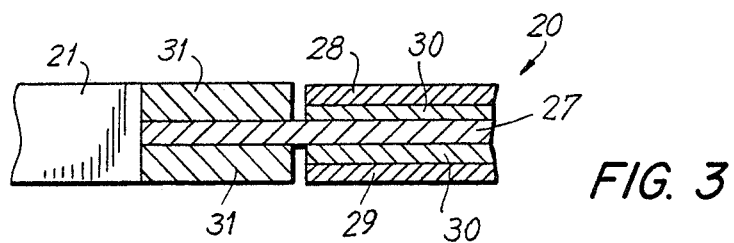
FIG. 3 is an enlarged section view taken along a line 3—3 in FIG. 2.
Figure 1:
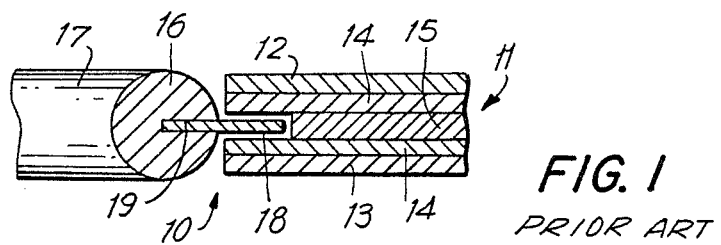
FIG. 1 is an enlarged section view of a conventional steel laminate gasket for showing bolt hole area.

Referring to FIGS. 2 and 3, a first embodiment 20 of a steel laminate gasket of the present invention is shown. In this embodiment, the gasket 20 is provided with a hole 21 for a chain case as well as four cylinder bores 22, bolt holes 23, and cooling water holes 24.

The gasket 20 is divided into a high pressure receiving portion 25 for covering an area adjacent the cylinder bores 22 and holes 23, 24, and a non-high pressure receiving portion 26 for covering an area around the hole 21. When the gasket 20 is situated between two engine blocks and is tightened by bolts (not shown), high pressure is applied to the high pressure receiving portion 25, while non-high pressure is applied to the non-high pressure receiving portion 26.

As shown in FIG. 3, the gasket 20 comprises a core plate 27 extending throughout the entire area thereof, i.e. the high and non-high pressure receiving portions 25, 26. At the high pressure receiving portion 25, an upper plate 28, a lower plate 29 and two middle plates 30 are laminated so that the core plate 27 is located in the center thereof. On the other hand, at the nonhigh pressure receiving portion 26, soft sheets 31, such as beater sheets formed by a beater manufacturing method, compressed sheets, graphite sheets, or the like, which are made of a gasket material, such as asbestos, mixture of gum and asbestos, mixture of gum and synthetic fibers, or graphite, are attached onto the core plate 27. The soft sheets 31 are glued onto the core plate 27.

In this embodiment, since the high pressure receiving portion 25 is formed of the steel plates, high pressure can be applied to the high pressure receiving portion 25 for sealing properly thereat. Further, since the soft sheets 31 are attached to the core sheet 27 at the non-high pressure receiving portion 26, the non-high pressure receiving portion 26 can be properly sealed when receiving non-high pressure thereat.

In this embodiment, the high and non-high pressure receiving portions are integrally connected together by means of the core plate 27, so that it is unnecessary to assemble the high and non-high pressure receiving portions after these portions are independently formed. Therefore, there is less possibility that the gasket of the invention is damaged when assembled, in comparing with the conventional gaskets.

FIGS. 4 and 5 show a second embodiment 35 of the steel laminate gasket of the present invention. In this embodiment, the gasket 35 includes a high pressure receiving portion 36 for covering an area adjacent the cylinder bores 22 and the holes 23, 24, and a non-high pressure receiving portion 37 for covering an area around holes 38 for push rods.

As clearly shown in FIG. 5, the gasket 35 includes a core plate 39 extending throughout the entire area of the gasket including the high and non-high pressure receiving portions 36, 37. At the high pressure receiving portion 36, two middle plates 40 and an upper plate 41 are laminated onto the core plate 39, while at the non-high pressure receiving portion 37, a soft sheet 42 made of a gasket material is glued onto the core plate 39.

Even if the soft sheet 42 and plates 40, 41 are laminated on one side of the core plate 39 respectively, the high and non-high pressure receiving portions 36, 37 of the gasket 35 can seal the engine blocks properly.

Figure 6:
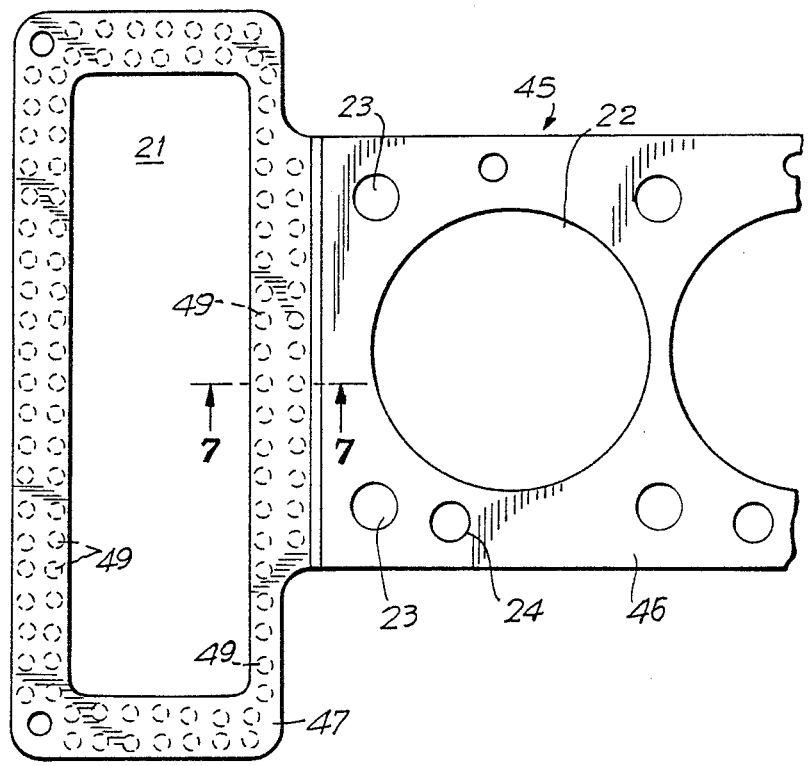
FIG. 6 is a plan view of a part of a third embodiment of a steel laminate gasket of the invention.
Figure 7:
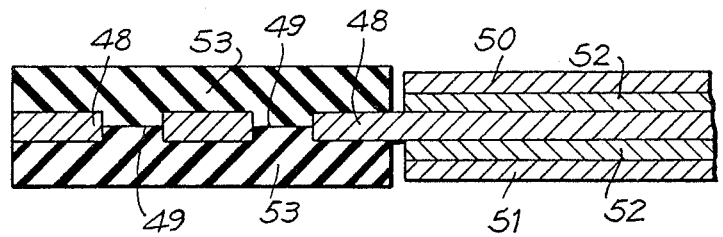
FIG. 7 is an enlarged section view taken along a line 7—7 in FIG. 6.

FIGS. 6 and 7 show a third embodiment 45 of the steel laminate gasket of the present invention. In this embodiment, the gasket 45 includes a high pressure receiving portion 46 for covering an area adjacent the cylinder bores 22 and the holes 23, 24, and a non-high pressure receiving portion 47 for covering an area around the hole 21 for the chain case.

The gasket 45 includes a core plate 48 extending throughout the entire area of the gasket including the high and non-high pressure receiving portions 46, 47. At the high pressure receiving portion 46, the core plate 48 is solid, and an upper plate 50, lower plate 51 and two middle plates 52 are laminated so that the core plate 48 is located in the center thereof.

At the non-high pressure receiving portion 47, the core plate 48 is provided with a plurality of small holes 49 therein, and soft sheets 53, made of a gasket material, are attached onto the core plate 48. When the soft sheets 53 are attached to the core plate 48, glue is applied onto the inner sides of the soft sheets 53. The soft sheets 53 are then pushed onto the core plate 48, so that parts of the soft sheets 53 enter into the holes 49 and connected together through the holes 49. The soft sheets 53 are directly attached to the core plate 48 by glue, as well. Accordingly, the soft sheets 53 can be securely attached to the core plate 48.

FIG. 8 shows a fourth embodiment 60 of the steel laminate gasket of the invention. The gasket 60 is provided with two core plates 61, 62 extending throughout the entire area of the gasket. The core plate 61 includes an upper plate 63 at the high pressure receiving portion and a soft sheet 64 at the non-high pressure receiving portion. The core plate 62 includes a lower plate 65 at the high pressure receiving portion and a soft sheet 66 at the non-high pressure receiving portion. The core plates 61, 62 abut against each other, between which a layer or thin coating 67 is formed. The layer 67 prevents liquid from entering into a space between the two core plates.

In the gasket 60, the total thickness of the core can be increased while the respective core plates 61, 62 are kept thin, so that the thickness of the soft sheet can be decreased. Namely, since the thickness of the soft sheet is thin, creep-relaxation of the soft sheet can be diminished.

FIG. 9 shows a fifth embodiment 70 of the steel laminate gasket of the invention, which is similar to the gasket 35 shown in FIGS. 4 and 5. The gasket 70 includes a core plate 71 extending throughout the entire area of the gasket. The core plate 71 is provided with a projection 72 extending upwardly therefrom around the hole 38 at the non-high pressure receiving portion. The projection 70 may not be formed around the entire peryphery of the hole 38.

At the high pressure receiving portion, an upper plate 73 and two middle plates 74, 75 are laminated onto the core plate 71, while at the non-high pressure receiving portion, a soft sheet 76 is attached to the core plate 71 inside the projection 72. The projection 72 prevents movement of the soft sheet 76.

In the present invention, the high pressure receiving portion of the steel laminate gasket is formed of the core plate and at least one metal sheet for properly sealing even if high pressure is applied thereto, and the non-high pressure receiving portion is formed of the core plate and at least one soft sheet made of a gasket material for properly sealing when receiving non-high pressure. The high and non-high pressure receiving portions are integrally connected together, so that it is easy to assemble the engine parts with the steel laminate gasket of the present invention.

While the invention has been explained with reference to the specific embodiments of the invention, the explanation is illustrative and the invention is limited only by the appended claims.

What is claimed is:

1. A steel laminate gasket for sealing engine parts having high and non-high pressure areas, comprising:
   at least one core plate extending throughout entire area of the engine to be sealed,
   at least one soft sheet situated above the core plate, said soft sheet being made of a soft gasket material and placed around at least one hole at the non-high pressure area so that the hole at the non-high pressure area is sealed by the core plate and the soft sheet, and
   at least one metal plate situated above the core plate to form a steel laminate structure at an area where the soft sheet is not placed so that the area not covered by the soft sheet is sealed by the core plate and the metal plate, whereby the hole to be sealed and located at the non-high pressure area is securely sealed by the soft sheet and core sheet and the rest of the area of the gasket including holes in the high pressure area is sealed by the metal plate and the core sheet.

2. A steel laminate gasket according to claim 1, in which said soft sheet is one of a beater sheet, a compressed sheet and a soft graphite sheet.

3. A steel laminate gasket according to claim 1, in which said soft sheet is adhered to the core plate by glue.

4. A steel laminate gasket according to claim 1, further comprising at least one second metal plate situated below the core plate adjacent to the high pressure areas of the engine, and at least one second soft sheet situated below the core plate adjacent to the non-high pressure areas of the engine.

5. A steel laminate gasket according to claim 1, in which said core plate includes an end portion at the non-high pressure area, said end portion having at least one projection extending toward the soft sheet so that the soft sheet does not move relative to the core plate.

6. A steel laminate gasket according to claim 1, further comprising a second core plate situated below the core plate, at least one second metal plate situated below the second core plate adjacent to the high pressure areas of the engine, at least one second soft sheet situated below the second core plate adjacent to the non-high pressure areas of the engine, and a layer formed between the core plate and the second core plate to prevent fluid from entering thereinto.

7. A steel laminate gasket according to claim 1, in which said core plate is provided with a plurality of small holes adjacent to the non-high pressure areas of the engine so that when the soft sheet is placed above and pushed against the core plate, the soft sheet is engaged with the small holes of the core plate thereby to hold the soft sheet securely on the core plate.

8. A steel laminate gasket according to claim 7, further comprising at least one second metal plate situated below the core plate adjacent to the high pressure areas of the engine, and at least one second soft sheet situated below the core plate adjacent to the non-high pressure areas of the engine, said soft sheet and second soft sheet abutting against each other through the small holes and being directly glued together.

9. A steel laminate gasket for sealing engine parts having high and non-high pressure areas, comprising:
 at least one core plate extending throughout entire area of the engine to be sealed,
 at least one metal plate situated above the core plate, said metal plate being placed adjacent to the high pressure areas of the engine so that the high pressure areas of the engine are sealed by the core plate and the metal plate,
 at least one soft sheet situated above the core plate, said soft sheet being made of a soft gasket material and selected from one of a beater sheet, a compressed sheet and a soft graphite sheet, said soft sheet being placed adjacent to the non-high pressure areas of the engine and adhered to the core plate by glue so that the non-high pressure areas of the engine are sealed by the core plate and the soft sheet,
 a second core plate situated below the core plate,
 at least one second metal plate situated below the second core plate adjacent to the high pressure areas of the engine,
 at least one second soft sheet situated below the second core plate adjacent to the non-high pressure areas of the engine, and
 a layer formed between the core plate and the second core plate to prevent fluid from entering thereinto.

* * * * *

UNITED STATES PATENT AND TRADEMARK OFFICE
CERTIFICATE OF CORRECTION

PATENT NO. : 4,754,982
DATED : July 5, 1988
INVENTOR(S) : Tsunekazu Udagawa et al It is certified that error appears in the above-identified patent and that said Letters Patent are hereby corrected as shown below:

In tne title, change the title to --STEEL LAMINATE GASKET FOR PROPERLY SEALING HIGH AND NON-HIGH PRESSURE AREAS--.

Claim 1, line 17, change "core sheet" to --core plate--;

line 20, change "core sheet" to --core plate--.

Claim 3, line 1, change "1" to --2--.

Signed and Sealed this

Sixth Day of December, 1988

Attest:

DONALD J. QUIGG

*Attesting Officer*  *Commissioner of Patents and Trademarks*